United States Patent [19]

Arnold et al.

[11] 4,402,176
[45] Sep. 6, 1983

[54] ROUND BALER AND DISCHARGE MEANS

[75] Inventors: John Arnold, Coldwater; Wilbur E. Groeneveld, Celina; Warner Heckley, Rockford; Leroy M. Kluver, Celina, all of Ohio; Richard W. Kunkle, Portland, Ind.

[73] Assignee: The Paul Revere Corporation, Greenwich, Conn.

[21] Appl. No.: 283,048

[22] Filed: Jul. 13, 1981

[51] Int. Cl.³ ............................................. A01D 39/00
[52] U.S. Cl. ......................................... 56/341; 100/88
[58] Field of Search ................. 56/341, 343, 344, 350; 100/88

[56] References Cited

U.S. PATENT DOCUMENTS

| 4,009,653 | 3/1977 | Sacht | 56/341 X |
| 4,244,166 | 1/1981 | Hayward | 56/341 |
| 4,262,478 | 4/1981 | Pentith | 56/341 |

Primary Examiner—Robert P. Swiatek
Attorney, Agent, or Firm—Abraham Ogman; Robert J. McNair

[57] ABSTRACT

A tractor drawn and powered machine is disclosed for forming large round bales of fibrous agricultural crops in a chamber of fixed size. The baling chamber consists of a lower and an upper section. The lower section includes a wheel mounted main frame, along with a pickup reel and a bottom conveyor comprising side by side belts entrained on four transversely extending rollers. The upper section is supported on a subframe which is hinge mounted along its front edge to the main frame allowing thereby the rear portion of the upper section to open as a rearward facing tailgate for discharge of a completed bale. Situated within the subframe of the upper section are all of the conveying elements which make up the rear, top and front of the generally cylindrical periphery of the baling zone. Each conveyor element in the upper section comprises a plurality of side by side belts entrained on spaced apart transversely mounted upstream and downstream rollers. A space between the last of the serially arranged conveying elements and the uppermost surface of the bottom conveyor provides an inlet into the baling chamber. During the bale forming operation a latch mechanism holds the tailgate closed. When a bale is ready for discharge the tractor is halted, the tailgate is opened by a hydraulic cylinder and the bale is conveyed out the rear of the machine. As soon as the bale falls to the ground, the tailgate can be reclosed making the machine ready for pickup of more crop material with which to form another bale.

7 Claims, 6 Drawing Figures

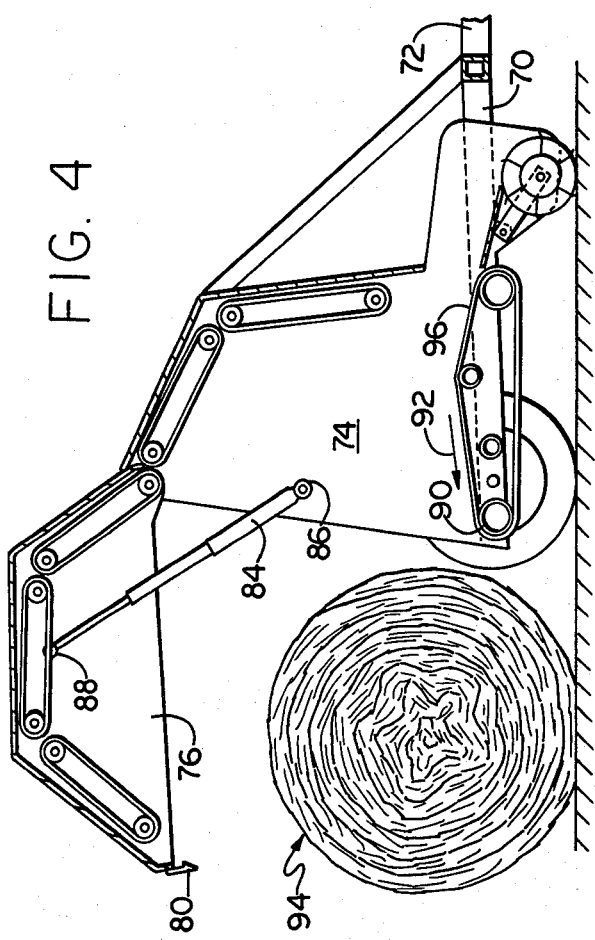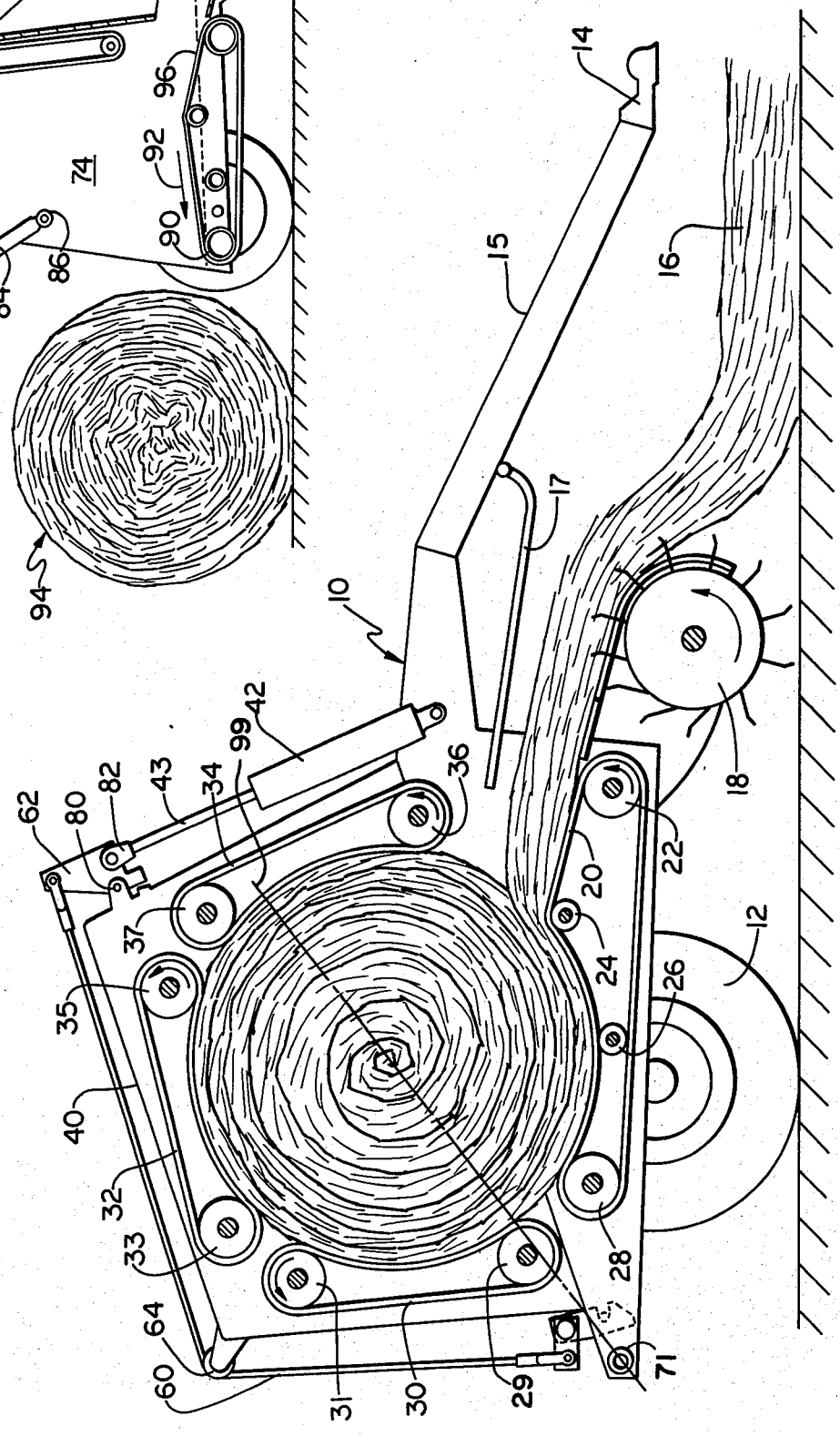

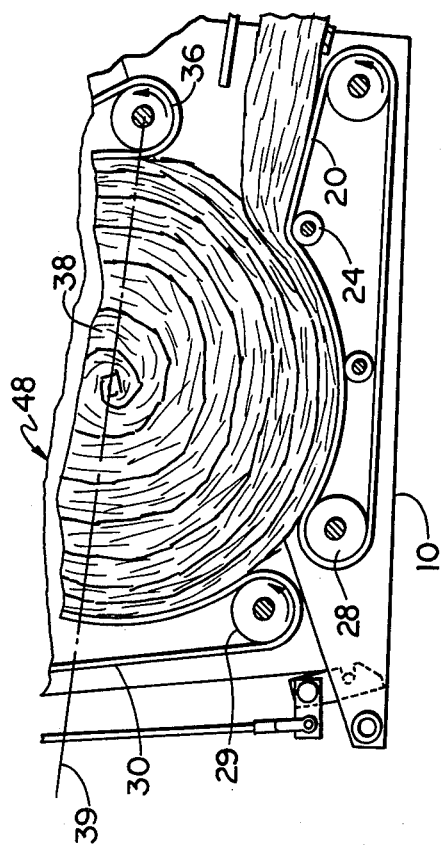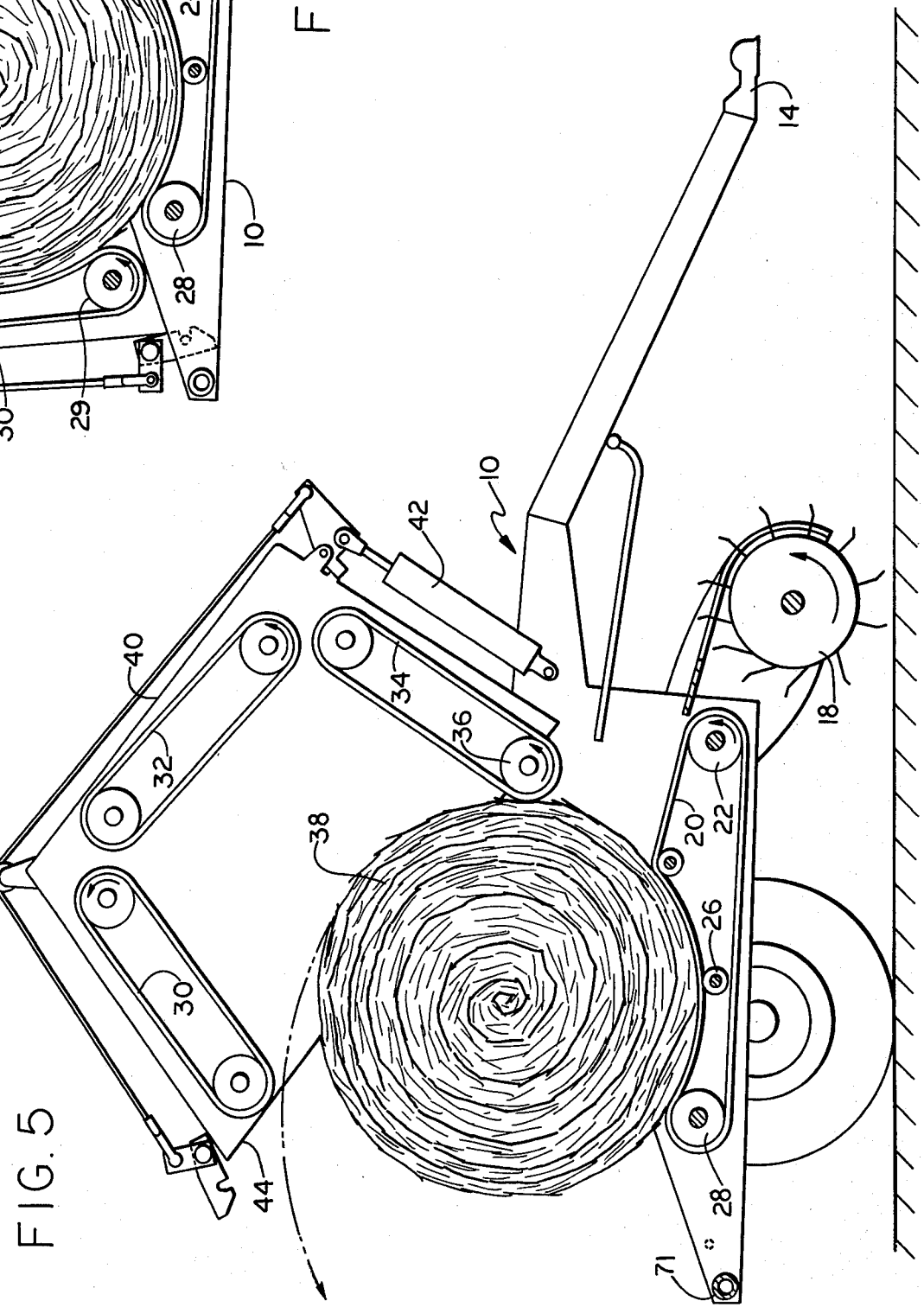

ROUND BALER AND DISCHARGE MEANS

BACKGROUND OF THE INVENTION

This invention relates to a machine for forming large round bales of fibrous agricultural crops. Our machine improves on the existing art in that the gate, through which a completed bale is discharged, can be reclosed without having to move the baler forward to obtain clearance.

Many bale forming machines exist which form fibrous agricultural crops into bales that are either twine or wire tied. For example, the U.S. Pat. No. 4,009,653 to Sacht discloses a method for forming large round bales in a machine comprising a cage-like frame having a horizontal axis and a generally cylindrical shaped baling zone. Upwardly extending machine sidewalls form the confining end surfaces of the baling zone. A plurality of serially arranged conveying elements enclose and generally define the circumferential periphery of the baling zone. Thus, the size of the baling chamber remains constant during the bale forming process. To accomplish discharge of a completed bale, the baling chamber is divided into two portions approximately along a vertically extending axis cutting plane. The rear portion of the housing is then configured to swing upward from a hinge point at the top, thereby allowing the bale to be discharged rearward.

The U.S. patent application having Ser. No. 162,372 and now U.S. Pat. No. 4,319,446 and assigned to the same assignee as this application discloses bale forming means which differ somewhat from the implementation of Sacht. Two additional rollers are added to support the bottom conveyor belts. As viewed from the side the improved system shows four rollers on which a plurality of laterally spaced belts are trained. The second and third rollers (which are respectively in the forward and aft portions of the conveyor midsection) and the fourth roller (which is at the rear of the machine) are disposed to be generally on the cylindrical periphery of the baling zone. The first roller is in front of and somewhat below the plane containing the axis of the third roller. The Arnold et al. invention improves on Sacht in two ways. First, the vertical dimension of the entrance throat is enlarged. This allows the baler to operate in a heavier stand of hay without becoming clogged. Second, by lowering the placement of the front roller, a pickup reel of smaller diameter can be used. This permits the flow of hay being picked up from the windrow to pass into the baling zone without undergoing abrupt changes in direction. The laterally spaced conveyor belts accept the crop material being passed on from the pickup reel and frictionally engage the crop strands to provide inward directed pressure to carry them into the baling zone.

This invention is shown in conjunction with a baler having a bottom conveyor member for receiving agricultural material which is constructed similar to that disclosed in the U.S. patent application having Ser. No. 162,372. Using this type of bottom conveyor, generally cylindrical bales are formed in a cavity of fixed size. The partially completed bale rotates on a horizontal axis while crop material picked up from a windrow is continuously added to the periphery of the bale. As the baling chamber fills, pressure is exerted on the surrounding enclosure. The enclosure is hinged along the front edge to allow the upper portion to open from the rear like a clam shell to enable discharge of a completed bale. A latch mechanism holds the opposing faces of the enclosure together until the bale is complete.

With our invention discharge of the completed bale is accomplished in a way which improves on Sacht. With the Sacht teaching, the rear portion of the baler housing swings upward from a hinge point at the top. Discharge of the bale leaves it under the overhanging raised portion of the tailgate structure. Before the tailgate can be closed, the operator has to move the baler ahead some eight or ten feet to allow the raised structure to clear the bale which is lying on its side on the ground. Since the baler has to be moved ahead to allow the tailgate to be closed, the operator of the Sacht machine goes through a sequence as follows. He stops his forward process along the windrow when a bale is formed. He then shifts the tractor into reverse, backing the baler up ten feet or thereabouts. The bale is then discharged and the tractor placed in forward drive. After driving ahead a few feet to enable the raised structure to clear the bale, the tractor clutch is then depressed and the tailgate of the baler closed. With the tailgate closed, the baler is ready to resume forward progress along the windrow.

Using our improved baler, the operator does not have to backup his machine to discharge a bale. The discharged bale does not prevent immediate closure of the tailgate since it is not deposited on the ground in an area which is under the overhanging raised structure. This ability to immediately close the tailgate saves time as well as wear and tear on both the tractor and the operator.

SUMMARY OF THE INVENTION

It is an object of this invention to provide a machine for forming large round bales of fibrous agricultural crops which is simple to operate. The baler that was first reduced to practice forms generally cylindrical bales in a chamber of fixed size. During the bale forming process, the partially completed bale rotates on a horizontal axis while crop material picked up from a windrow is continuously added to the periphery of the bale. As the baling chamber fills pressure is exerted on the peripheral elements of the enclosure. The enclosure is hinged along the front edge to allow the upper section to open like a clam shell for rearward discharge of a completed bale. A latch mechanism holds the opposing faces of the enclosure together until the bale is complete.

A key element in the implementation of our invention is the placement of the hinge point of the moveable upper section. We placed it at the most forward edge of the baling chamber, putting it generally at the same height above ground as the central axis of the chamber.

The upper section comprises a subframe covered by protective panels including a pair of spaced apart sidewalls mounted at right angles to the central axis of the baling chamber. Also situated in the moveable upper section are all of the conveying elements with the exception of the bottom conveyor. This includes those conveying elements which are serially disposed around the rear, top and front of the generally cylindrical periphery of the baling zone. This means that only the bottom conveyor is not enclosed in that portion of the baler which swings upward like a clam shell to provide a tailgate through which a completed bale can be discharged. Each conveyor element in the upper section comprises a plurality of side-by-side belts which are entrained on first and second spaced apart rollers having horizontal axes, the ends of each roller being journalled in the sidewalls of the moveable upper section. The rollers at the downstream end of each conveying element are synchronously driven from the PTO of the tractor. There is a space between the last of the serially arranged conveying elements and the uppermost surface of the bottom conveyor. This space provides an inlet to the baling chamber which extends the full width of the baler. The outwardly extending axial shaft of the last downstream roller additionally serves as the hinge point around which the upper section pivots. A hydraulically actuated piston appropriately mounted between the upper section subframe and a location on the main frame just forward of the hinge point serves as a motive force to open and close the tailgate.

As the bale forming sequence commences, crop material from the windrow will be picked and delivered into the baling chamber. As more and more material is gathered in, the conveying element belts roll the strands into a bale which fills the chamber from sidewall to sidewall. As the chamber fills, compressive forces exerted on the bale cause the tailgate to try to open. This places a load on the latch mechanism which holds the gate in the closed position. By placing a sensor in cooperation with the latch, it is possible to measure when a bale is ready for discharge. When the sensor reaches the tripped position, the operator will be alerted to the fact that a bale is completed.

At this time the operator stops the tractor to halt flow of crop material into the baling chamber. The bale is tied off with twine and the bale ejection sequence initiated. Bale ejection is accomplished by actuating the hydraulic piston which rotates the upper section around the hinge point. The tailgate opens sufficiently wide to enable the bale to pass rearwardly therethrough. The bottom conveyor moves continuously in a front to back direction throughout the discharge sequence causing the completed bale to drop off the back of the baler. A cross frame member positioned just rearward of the bottom conveyor assures that the bale drops onto the ground in a position which clears rotating machine components of the conveyor.

Once the bale has been discharged, the tailgate can be closed immediately. There is no need to move the baler forward in order to have the tailgate section clear the discharged bale. This means that our baler does not have to be backed up for bale discharging. The operator needs only to stop his tractor when he receives a signal that the baling chamber is full. The operator runs the PTO continuously during the entire baling cycle. When the forward motion of the baler is stopped and the bale is tied off it can then be discharged. When that sequence is complete and the tailgate reclosed, the operator engages the tractor in drive and proceeds along the windrow to form another bale.

BRIEF DESCRIPTION OF THE DRAWINGS

FIG. 2 is a cutaway view of the baler taken along line 2—2 of FIG. 1.

FIG. 4 is a cutaway view of a current art machine showing a discharged bale lying under the overhanging open tailgate.

FIG. 5 is a cutaway view of the baler with the bale being discharged.

FIG. 6 is a partial cutaway view of the baling chamber showing the geometrical constraints thereof.

DESCRIPTION OF THE PREFERRED EMBODIMENT

Figure 1:
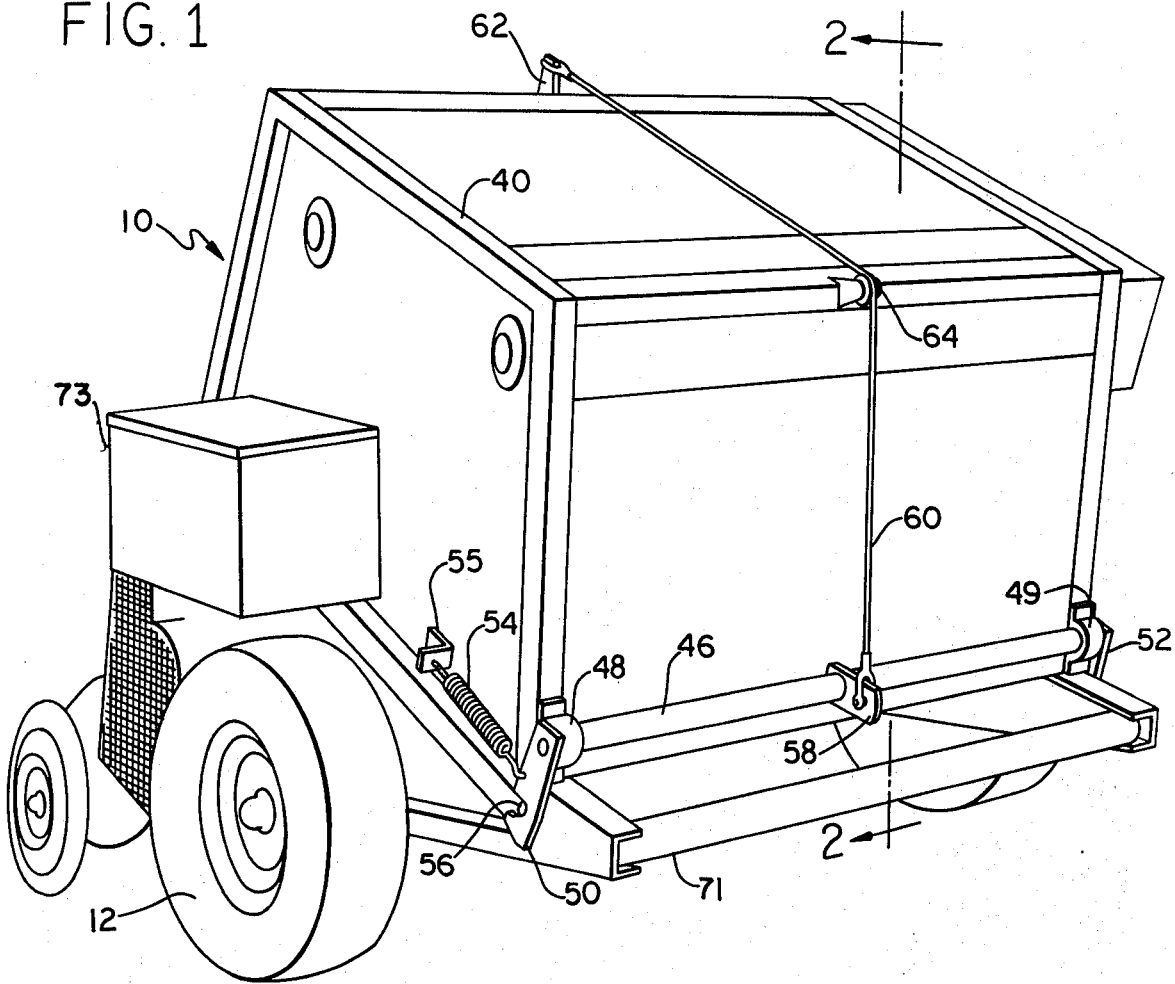
FIG. 1 is an isometric rear view of the baler.

FIG. 1 shows a rear view of a baler 10 which is capable of gathering crop material from a windrow and forming it into round bales generally cylindrical in shape. Baler 10 is supported by a pair of wheels 12. The baler is intended to be drawn behind a tractor and to be powered therefrom by means of a power-take off. The manner in which the baler operates is better seen by reference of FIG. 2. Baler 10 having wheels 12 supported from frame 15 is drawn behind a tractor by hitch 14. When appropriately drawn behind a tractor, astride a windrow of crop material 16, the baler gathers up the crop by means of pickup reel 18.

Pickup reel 18 delivers the crop material to a conveyor which forms the bottom of the baling zone. The conveyor comprises a plurality of side-by-side belts 20 which are carried over transversely extending rollers 22, 24, 26 and 28. In the unit reduced to practice 5 belts 20 were used to span a baling chamber 5 feet long. Rollers 24, 26 and 28 are generally on the periphery of the cylindrical shaped baling zone. Roller 22 is mounted lower than roller 24. This is done so that a line drawn tangent from the top of pickup reel 18 to the top of roller 24 passes tangentially over roller 22. This and a plurality of side-by-side guidance tines 17 help in the delivery of crop material to the baling zone.

Above the bottom conveyor is a series of independent conveyor assemblies which generally surround the cylindrical baling zone. Three such conveyor asemblies are shown. As implemented, they are of identical configuration. The rearmost of the serially arranged conveyor assemblies consists of upstream roller 29, downstream roller 31 and a multiplicity of side-by-side conveyor belts 30. Similarly, the topside conveyor assembly consists of downstream roller 35, upstream roller 33 and conveyor belts 32. The front conveyor assembly is made up of belts 34, downstream roller 36 and upstream roller 37. Rollers 29, 31, 33, 35 and 37 are journalled for rotation in the sidewalls of subframe 40. Subframe 40 is hinged at the front by the bearings (not shown) which secure the extended shaft of roller 36 to mainframe 15. Pivoting subframe 40 about roller 36 allows the rear edge 44 (See FIG. 3) to swing upward to provide a tailgate through which a completed bale can be discharged.

A latching mechanism to maintain the tailgate in a closed position is shown in FIG. 1. As shown in FIG. 1, the latch assembly comprises a transversely extending torque tube 46 rotatably mounted in bearing plates 48 and 49. On the left end of torque tube 46 is a first member in the form of latch plate 50. On the right end is a second like latch plate 52. There is a spring 54 having one end attached to latch plate 50 and its second end anchored to a bracket 55 that is secured to subframe 40. Spring 54 holds latch plate 50 against a pin 56 which is anchored to the baler frame. A slot formed in latch plate 50 allows the latch plate to lock the tailgate in the closed position. Latch plate 52 also has a similar slot which operates in conjunction with another pin extending from the far side of the baler frame. There is also a second spring 54 on the right side of the baler.

A crankarm 58 extends rearward from torque tube 46. A clevis arrangement secures one end of cable 60 to the outer end of crankarm 58. The second end of cable 60 is secured by means of a second clevis to pivot arm 62. Idler pulley 64 allows cable 60 to change directions and make connection with the end of pivot arm 62. An upward pull on cable 60 rotates the torque tube so that latch plates 50 and 52 are released from left side pin 56 and the pin to which latch 52 attaches. Release of the pull on cable 60 allows springs 54 to relatch the plates 50 and 52 to pins 56.

As the bale is formed it rotates in a clockwise direction as viewed in FIG. 2. Rotation is brought about by contact with belts 20, 30, 32 and 34 which move in the direction shown by the arrows shown in rollers 22, 31, 35 and 36. As the baling chamber fills, the outward pressure of the compressed crop strands stretches the belts taut so that they assume the configuration shown in FIG. 2. As the baling chamber becomes full, compressive forces exerted on the bale tend to force the tailgate open. An appropriately calibrated sensor can be incorporated into the latch assembly to signal that the bale is ready for discharge.

When the "chamber full" status is sensed, the operator stops the forward motion of the tractor, terminating pickup from windrow 16, thereby allowing the crop material at the pickup reel 18 to be carried on into the baling chamber. This done, the bale tying sequence is begun either manually or automatically using spools of twine carried in storage box 73 (See FIG. 1). On completion of the bale tying event hydraulic cylinder 42 is actuated to move the upper subframe 40 from the FIG. 2 to the FIG. 5 configuration.

Actuation of hydraulic cylinder 42 does the following. The movable shaft of hydraulic cylinder 42 is secured by pin means to pivot 62. Offset from this pin means is a second pin mounting means 80 which secures pivot 62 to subframe 40. Clevis 82 is depicted as the pin mounting means between shaft 43 of hydraulic cylinder 42 and pivot 62. With hydraulic cylinder 42 attached between subframe 40 and the mainframe of the baler in the manner depicted in FIG. 2, initiation of the piston withdrawing action, first causes pivot 62 to rotate in a clockwise direction as viewed in FIG. 2. Rotation of pivot 62 clockwise causes a pull to be exerted on cable 60 which is secured to the upper end of the pivot. A pull on cable 60 exerts through crankarm 58 a torque on torque arm 46 which unlatches latch plates 50 and 52 from pins 56.

With the two latch arms released, the hydraulic cylinder can complete the rotation of subframe 40 about the axle shaft of roller 36. Retraction of piston shaft 43 raises the tailgate to the FIG. 5 condition. With the baler positioned as shown in FIG. 5, the tied bale 38 is ready for ejection out the back of the baler. Subsequent to ejection, the tailgate can be reclosed by extension of shaft 43 of hydraulic cylinder 42. As shaft 43 reaches its openmost position, its length is such that pivot 62 is rotated counterclockwise to a position which allows springs 54 to draw latch plates 50 and 52 into the engaged position depicted in FIG. 1.

When this tailgate closing event is completed, the alert light will be extinguished signifying to the operator that he can restart the tractor to gather hay for making another bale.

The ejection of bale 38 from the depression formed when belts 20 conform to the placement of rollers 24, 26 and 28 requires the introduction of a coupling force synchronized with the opening of tailgate 44. The need for the coupling force comes about since the bale sets in a depression formed by placing roller 24, 26 and 28 on the circumference of a circle. This placement creates the tendency for bale 38 to continue rotating in place when tailgate 44 opens to the FIG. 5 configuration. By introducing bale contacting means (not shown) subsequent to the opening of tailgate 44, the bale can be made to stop rotating about its central axis. This application of a coupling force transfers the center of rotation from the bale axis toward the upward periphery, thereby allowing the bottom conveyor belts 20 to move the bale rearward and out of the baler. As soon as the center of mass passes beyond roller 28, gravity will take over and the bale will roll downward over rear frame member 71.

Figure 3:
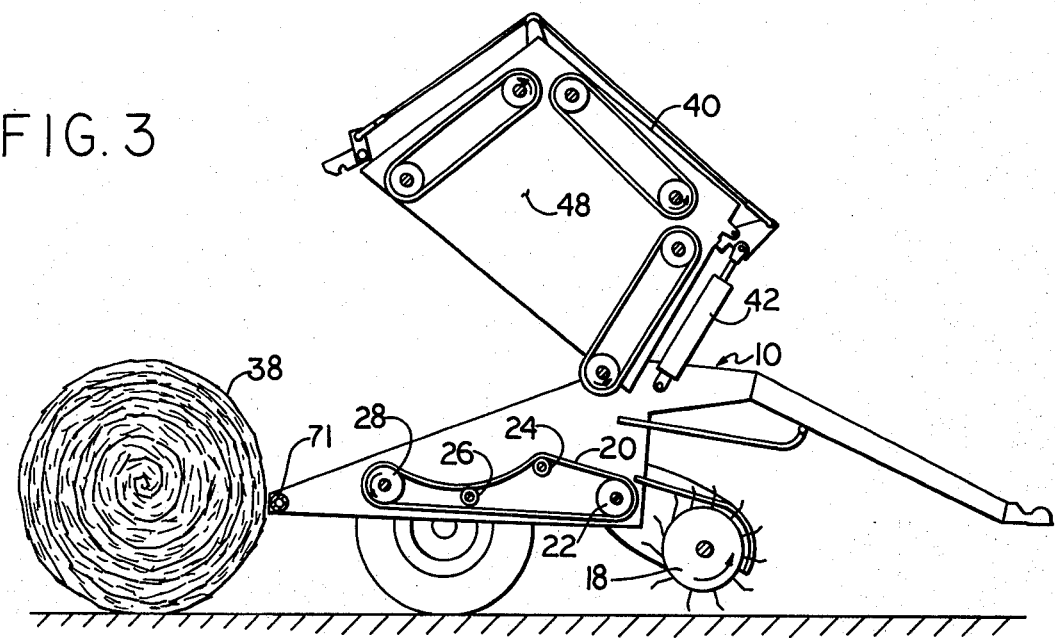
FIG. 3 is a cutaway view showing the tailgate open and a discharged bale lying immediately behind the baler.

As it drops to the ground, bale 38 assumes the position shown in FIG. 3. During the discharge event forward motion of baler 10 has been stopped. Therefore, after bale 38 drops to the ground it will remain at a fixed distance from the rear of the baler. Cross rear frame member 71 keeps the bale clear from moving belts 20 and roller 28. Additionally, the bale is clear of those areas of the baler with which tailgate 44 mates. This means that as soon as bale 38 is discharged, tailgate 44 can be closed by extending the shaft of hydraulic cylinder 42. With the tailgate closed and latches 50 and 52 secured, the operator can restart the forward motion of the tractor to initiate pickup of crop material 16 from the windrow.

This differs from what can be done with the prior art baler shown in FIG. 4. The FIG. 4 baler has a bottom conveyor belt assembly 96 which is basically the same as that of the FIG. 3 baler. The FIG. 4 baler comprises a single axle chassis 70 having a tow bar tongue 72 extending out the front for attachment to a tractor or similar vehicle. The upper structure is comprised of skeletal members onto which sheets of metal are secured. There is a front part 74 and a rear part 76. Together, they form a horizontal, generally cylindrical baling zone. Rear part 76 is hinge mounted to front part 74 by means of a pivot bearing at the topmost one of the rollers. This allows the rear part 16 of the baler to be swung upward approximately 90 degrees when discharging a completed bale 94.

Latch 80 can be released when the baling chamber is full. With the latch released, hydraulic cylinder 84 can be extended to open the tailgate since the cylinder ends are anchored to the baler sidewalls by pins 86 and 88. With the tailgate open to the FIG. 4 configuration the bottom conveyor assembly continues to move in the direction shown by arrow 92 carrying bale 94 past rear roller 90 and causing it to drop to the ground as shown. Since bale 94 drops down just back of the baler, it comes to rest under the overhanging tailgate. Before the tailgate can be closed the prior art baler must be moved ahead by at least the width of the bale.

To accomplish the step of having to move the baler ahead almost ten feet before the tailgate can be closed after discharging a bale, the operator of the prior art baler has to do extra work. When the bale is ready for discharge, the operator stops the forward motion of the tractor along the windrow, shifts it into reverse, backs up eight-to-ten feet and initiates the discharge sequence. When the bale is discharged, as shown in FIG. 4, the operator drives ahead a few feet, stops and initiates the tailgate closing sequence. When the tailgate is closed, the operator can then restart the tractor to undertake pickup of crop material for the next bale. If the operator of the prior art baler does not backup before discharging a bale, crop material from the windrow is encountered when the baler is moved ahead to provide clearance for the downswinging tailgate. Any crop material picked up while the tailgate is open will pass on through the baler.

With applicants' baler there is no need to backup the machine to obtain clearance for closing the tailgate. As soon as the bale strikes the ground, as shown in FIG. 3, the tailgate can be reclosed. The reason the tailgate can be reclosed immediately after bale discharge has to do with the placement of the pivot. The upper section (See FIG. 2) pivots relative to the lower section at the shaft of roller 36 to open and close the cavity. The pivot location is elevated relative to rear frame member 71 so that it is below the intersection of diameter 99 which joins the rear frame member 71 and the central axis of the bale cavity with the front periphery of the bale cavity. The avoidance of machine backup saves both time and wear on the clutch mechanism of the tractor used to pull the baler.

Applicants discovered that all conveyor assemblies above the bottom conveyor could be incorporated into the subframe which is hinge mounted along one edge. Reference to FIGS. 2 and 6 shows that more than half of the periphery of bale 38 is circumscribed by the conveyor assemblies mounted in the upper section. Line 39 in FIG. 6 passes through both front roller 36 and the center of bale 38. As such line 39 coincides with a diameter of the bale which is seen to be greater than the spacing between roller 29 and 36. When the tailgate opens to the FIG. 5 configuration, the conveyor assembly containing belts 30 and roller 29 must slip past the full cross-section of the bale. For this to happen, the bale must be sufficiently compressible so that the instantaneous diameter of the bale in the fore to aft dimension does not exceed the spacing between rollers 29 and 36.

Several factors contribute to the release of the bale. One is the bale's weight which is usually in excess of a quarter of a ton. Another is the fact that the contacting belts are moving, hence one is dealing with friction and does not have to include breakaway forces which some call stiction. Third, the baling action in the chamber is such that most crop strands are oriented circumferentially around the bale. As a result, the release of the bale by the upper section of conveyor is such that slippage is lengthwise along the crop stems which minimizes binding due to bunching of crop material. Fourth and probably most important the bale is able to flex. Pressure applied across one diameter results in the bale assuming a slightly elliptical cross section.

Our discovery that a tightly packed bale of crop material could still be flexed made it possible to configure a baler having a tailgate which opens like a clam shell. The upper section being hinged at the front has a rearward facing tailgate which raises upward for discharge by an amount which exceeds the diameter of the bale. In the machine reduced to practice, four foot diameter bales were produced.

While the invention has been described in conjunction with a baler which forms large round bales in a chamber of fixed size, it will be understood that it can be of equal utility in other embodiments. Various changes in the details, materials, steps and arrangement of parts may be made and will occur to those skilled in the art upon a reading of the above disclosure. Therefore, the invention should not be limited to the specific illustration disclosed, but only by the following claims.

We claim:

1. In combination with a tractor drawn round bale forming machine of the type wherein there is a bale forming chamber of fixed size having a horizontal axis and including a lower section comprising a wheel mounted main frame, a pickup reel, a bottom conveyor incorporating a multiplicity of side by side belts entrained on transversely extending rollers rotatably mounted in the main frame and means for driving said pickup reel and bottom conveyor; there being further provided an upper section of the machine which includes a subframe, hinge mounted along its front edge to said main frame, the inner rear, top and front sides of said subframe being lined with conveying elements which make up the generally cylindrical periphery of all of the bale forming chamber exclusive of that encompassed by the bottom conveyor, each conveying element in the upper section comprising a plurality of side by side belts entrained on an upstream and a downstream roller, said rollers being spaced apart and mounted for rotation in said subframe, there being a space between the last of the serially arranged conveying elements and the uppermost surface of said bottom conveyor to form thereby an inlet to said bale forming chamber, the upper and lower sections having a joint therebetween which is spanned by a releasable latch for retaining said upper and lower sections in a locked condition during the bale forming operation; the improvement comprising:
    sensor means for signalling that a bale is ready for discharge from said bale forming chamber;
    latch opening means for releasing the locked condition between said upper and lower sections;
    pivoting means mounted between said main frame and said subframe for rotating said upper section upward about said hinge and forming thereby an open tailgate through which a completed bale can be rearwardly discharged, the location of said hinge being generally at the same height above ground as the central axis of said chamber, thereby causing the path followed by the rearmost part of said upper section to not pass rearward of the lower section during opening of said tailgate;
    bale releasing means utilizing gravitational force to create diametral pressure on the completed bale and causing ellipsoidal flexing thereof; and
    bale discharging means including continuous movement of said bottom conveyor in a front to rear direction throughout, causing the completed bale to drop off the back of the machine, followed thereafter by immediate reclosure of said tailgate without need for machine movement to gain clearance with respect to the discharged bale.

2. The invention as defined in claim 1 wherein the pivoting means includes at least one hydraulically actuated cylinder.

3. The invention as defined in claim 1 wherein all conveying elements in said upper section are alike with all side by side belts having the same spacing between the first and second ends thereof.

4. The invention as defined in claim 1 wherein the upper section includes three conveying elements, one each at the rear, top and front sides.

5. A bale forming means having an upper and lower section defining a round bale forming cavity, the upper section acting as a tailgate through which a bale is expelled from the cavity, said lower section having a transversely positioned rear frame member; pivoting means connecting the upper and lower sections at the front periphery of the cavity, said upper section pivots relative to the lower section to open and close said cavity; said pivoting means being elevated relative to said rear frame member so that it is no higher than the midpoint of the diameter joining the rear frame member and the central axis of the bale cavity with the front periphery of the bale cavity, means for raising and lowering said upper section; and means for moving the bale in a front to back relationship for discharging a finished bale over said rear frame member and out through said raised upper section.

6. A round baler as defined in claim 5 wherein the discharging means is a conveyor situated in the lower section which rotates the bale in a clockwise direction as viewed from the right hand side of said baler.

7. A baler as defined in claim 5 wherein the lower section is a shallow concave section defining less than one-half of the bale forming cavity.

* * * * *